Jan. 29, 1946.  W. MULFORD  2,393,926
FRICTION CLUTCH
Filed Aug. 9, 1943
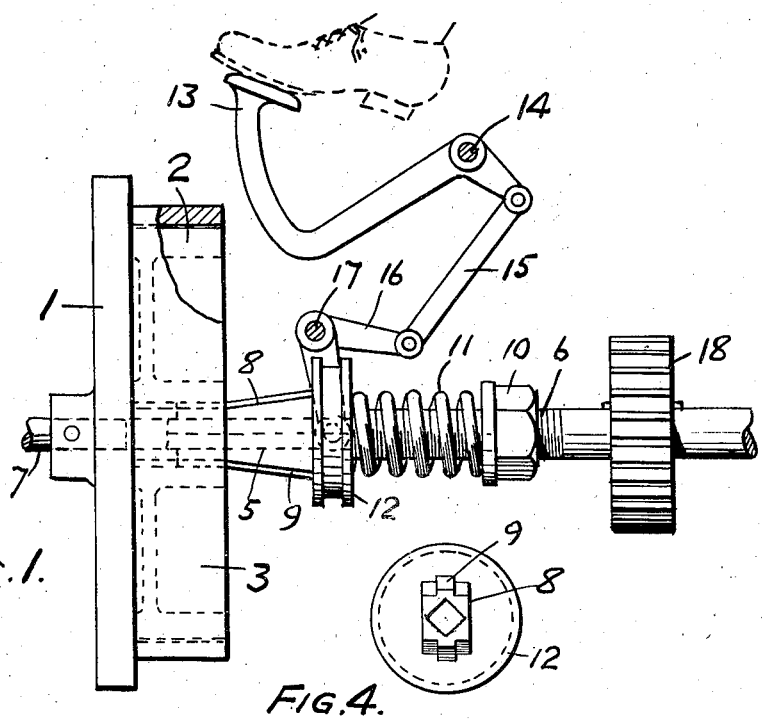
Fig.1.
Fig.4.
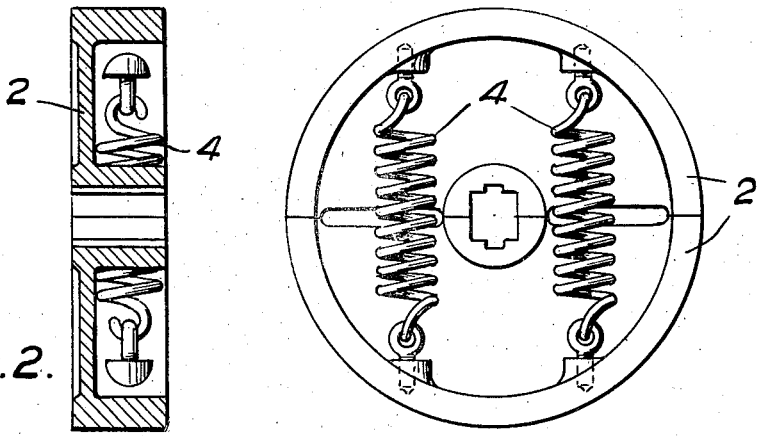
Fig.2.
Fig.3.
INVENTOR
William Mulford
BY
Augustus B. Stoughton
ATTORNEY.
WITNESS:
Rob't P. Kitchel Patented Jan. 29, 1946

2,393,926

UNITED STATES PATENT OFFICE 2,393,926

FRICTION CLUTCH

William Mulford, Gladwyne, Pa., assignor to Milford F. Dilks and William A. Mulford, both of Bryn Mawr, Pa., a partnership Application August 9, 1943, Serial No. 497,904

2 Claims. (Cl. 192—76)

The objects of the present invention are to provide an internal clutch mechanism useful in the transmission mechanism of automobiles and in which wear is automatically compensated for and in which the degree of clutching pressure may be adjusted; and to provide a simple, reliable and efficient clutch of the internal type.

Other objects of the invention will appear from the following description at the end of which the invention will be claimed.

Generally stated, the invention comprises, a spring acting on the wedge elements and tending to put the clutch into engagement, a nut on which the spring abuts and which serves for adjusting the tension of the spring and taking up wear, and means for overcoming the tension of the spring and putting the clutch out of engagement.

The invention also comprises the improvements to be presently described and finally claimed.

In the following description, reference will be made to the accompanying drawing forming part hereof and in which:

Figure 1 is an elevational view of a clutch embodying features of the invention;

Figure 2 is a transverse sectional view of the clutching elements detached;

Figure 3 is an elevational view of the same; and

Figure 4 is an end view of the wedge element.

Referring to the drawing, 1 indicates a power-driven, rotatable clutch member provided with an annular chamber concentric with its axis of rotation. 2 indicates a pair of spring-retracted semi-circular jaws arranged in said chamber and adapted to engage and disengage the inner surface of the rim 3 of the annular chamber. 4 are springs soliciting the clutch jaws out of engagement with the inner surface of the rim 3. A driven shaft extends through and beyond said jaws and is provided with a squared portion 5 at said jaws and is provided with a threaded portion 6. The cylindrical portion 7 is a part of the crank shaft. 8 indicates a wedge element generally rectangular in cross-section and slidably mounted on the squared portion of the shaft and it cooperates with the clutch elements and is provided with fins 9 working in grooves provided in the clutch elements 2. 10 is an adjustable nut mounted on the threaded portion 6 of the shaft. A spring 11 encircles the threaded portion of the shaft and is interposed between the nut 10 and the pulley portion 12 of the wedge element 8 which it solicits into clutch-engaging position with a force adjustable by positioning the nut 10. 13 is a foot lever pivoted at 14 and connected by a link 15 with one arm of a crank lever 16 pivoted at 17, and the other arm of which engages a groove in a circular flange on the wedge element and operates to throw the clutch out of engagement. Keyed to the driven shaft is a toothed wheel 18 forming part of the transmission mechanism of an automobile.

In use, the clutch is normally engaged under the tension of the spring 11 and revolves with the element 1 and thus transmits motion to the gear wheel 18. By adjusting the spring 11 by means of the nut 10, the force bringing about this engagement may be readily increased or diminished and wear may be compensated for by simply turning the nut 10. When the foot pedal is depressed, the force of the spring 11 is overcome and the clutch is thrown out of engagement. Release of the pedal 13 permits the clutch to re-engage so that the gear wheel 18 is driven.

It will be obvious to those skilled in the art to which the invention relates that modifications may be made in details of construction and arrangement and in matters of mere form without departing from the spirit of the invention.

I claim:

1. In a clutch for the transmission mechanism of automoiles comprising a power-driven rotatable clutch member provided with an annular chamber concentric with the axis of rotation and a pair of spring-retracted semi-circular clutch elements arranged in said chamber and respectively movable with a motion of translation and adapted to engage and disengage the inner surface of the annular rim thereof, the combination of a driven shaft extending through and beyond said clutch elements and having a squared portion at said clutch elements and a threaded portion and a cylindrical portion respectively on opposite sides of the squared portion, a wedge element generally rectangular in cross-section and slidable on the squared portion of the shaft and co-operating with the clutch elements and having fins working in grooves provided in the clutch elements, the wedge element extending outside of and beyond the clutch proper, an adjustable nut on the threaded portion of the shaft, a spring encircling the threaded portion of the shaft and interposed between the nut and the wedge element which it solicits into clutch-engaging position with a force adjustable by the position of the nut, the nut and spring located outside of and clear of the clutch proper, and a foot lever and its connections to the wedge element and operative for releasing the clutch.

2. In an internal clutch for the transmission mechanism of automobiles the combination of a driven shaft of which a portion extending outside of the clutch proper is rectangular in cross-section, a spring-pressed foot-retracted wedge element provided with fins and extending outside of the clutch proper, spring-retracted semi-circular clutch elements respectively provided with centrally disposed rectangular segments of an opening and including grooves for the accommodation of the fins.

WILLIAM MULFORD.